(12) United States Patent
Desai et al.

(10) Patent No.: US 10,498,160 B2
(45) Date of Patent: Dec. 3, 2019

(54) EFFICIENCY MAXIMIZATION FOR DEVICE-TO-DEVICE WIRELESS CHARGING

(71) Applicant: Massachusetts Institute of Technology, Cambridge, MA (US)

(72) Inventors: Nachiket V. Desai, Cambridge, MA (US); Anantha P. Chandrakasan, Belmont, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 293 days.

(21) Appl. No.: 15/223,378

(22) Filed: Jul. 29, 2016

(65) Prior Publication Data

US 2017/0040831 A1    Feb. 9, 2017

Related U.S. Application Data

(60) Provisional application No. 62/200,168, filed on Aug. 3, 2015.

(51) Int. Cl.
| | |
|---|---|
| *H02J 7/00* | (2006.01) |
| *H02J 7/14* | (2006.01) |
| *H02J 7/02* | (2016.01) |
| *H02J 50/12* | (2016.01) |

(52) U.S. Cl.
CPC .............. *H02J 7/025* (2013.01); *H02J 50/12* (2016.02); *H02J 7/0054* (2013.01); *Y02B 40/90* (2013.01)

(58) Field of Classification Search
USPC ....... 320/103, 107, 108, 109, 132, 134, 135, 320/136, 162, 104
See application file for complete search history.

(56) References Cited

U.S. PATENT DOCUMENTS

| | | | |
|---|---|---|---|
| 5,608,306 | A | 3/1997 | Rybeck et al. |
| 6,100,663 | A | 8/2000 | Boys et al. |
| 6,844,755 | B2 | 1/2005 | Ajit |
| 6,975,092 | B2 | 12/2005 | Edington et al. |
| 7,276,857 | B2 | 10/2007 | Logsdon et al. |

(Continued)

FOREIGN PATENT DOCUMENTS

| | | |
|---|---|---|
| CN | 103346591 A | 10/2013 |
| WO | WO 01/03288 A1 | 1/2001 |

(Continued)

OTHER PUBLICATIONS

PCT International Preliminary Report dated Feb. 15, 2018 for International Application No. PCT/US2016/045082; 12 Pages.

(Continued)

*Primary Examiner* — Alexis B Pacheco
(74) *Attorney, Agent, or Firm* — Daly, Crowley, Mofford & Durkee, LLP (57) ABSTRACT

Described is a receiver for improving end-to-end efficiency in a device-to-device wireless charging system using resonant energy transfer through an inductive link. The receiver includes an efficiency controller which dynamically tracks a maximum efficiency point and controls an impedance between an inductive coupling of the receiver and a receiver rectifier circuit such that an impedance seen by the inductive coupling is an impedance which maximizes (or nearly maximizes) efficiency of the inductively coupled wireless power transfer operation.

20 Claims, 7 Drawing Sheets

(56) References Cited

U.S. PATENT DOCUMENTS

| | | | |
|---|---|---|---|
| 7,474,062 | B2 | 1/2009 | Boys et al. |
| 7,522,878 | B2 | 4/2009 | Baarman |
| 7,605,496 | B2 | 10/2009 | Stevens et al. |
| 7,633,235 | B2 | 12/2009 | Boys |
| 7,639,514 | B2 | 12/2009 | Baarman |
| 7,675,197 | B2 | 3/2010 | Tetlow |
| 7,781,916 | B2 | 8/2010 | Boys |
| 8,050,068 | B2 | 11/2011 | Hussmann et al. |
| 8,076,801 | B2 | 12/2011 | Karalis et al. |
| 8,093,758 | B2 | 1/2012 | Hussmann et al. |
| 8,183,938 | B2 | 5/2012 | Boys et al. |
| 8,290,649 | B2 | 10/2012 | Iwashita et al. |
| 8,294,555 | B2 | 10/2012 | Tetlow |
| 8,667,452 | B2 | 3/2014 | Verghese et al. |
| 9,077,261 | B2 | 7/2015 | Yamamoto |
| 9,287,719 | B2 | 3/2016 | Katsunaga et al. |
| 9,768,732 | B2 | 9/2017 | Briffa et al. |
| 9,819,272 | B2 | 11/2017 | Perreault et al. |
| 10,038,461 | B2 | 7/2018 | Briffa et al. |
| 10,164,472 | B2 | 12/2018 | Chandrakasan et al. |
| 2006/0274469 | A1 | 12/2006 | Nielsen |
| 2008/0067874 | A1 | 3/2008 | Tseng |
| 2009/0174263 | A1 | 7/2009 | Baarman et al. |
| 2009/0302933 | A1 | 12/2009 | Boys et al. |
| 2010/0045114 | A1 | 2/2010 | Sample et al. |
| 2010/0148723 | A1 | 6/2010 | Cook et al. |
| 2011/0090723 | A1 | 4/2011 | Hu et al. |
| 2011/0117860 | A1 | 5/2011 | Kimball |
| 2011/0193417 | A1 | 8/2011 | Hirasaka et al. |
| 2011/0234011 | A1 | 9/2011 | Yi et al. |
| 2011/0241437 | A1 | 10/2011 | Kanno |
| 2011/0248571 | A1 | 10/2011 | Kim et al. |
| 2011/0254379 | A1 | 10/2011 | Madawala |
| 2011/0266882 | A1 | 11/2011 | Yamamoto et al. |
| 2011/0299313 | A1 | 12/2011 | Hussmann et al. |
| 2011/0304216 | A1 | 12/2011 | Baarman |
| 2012/0002446 | A1 | 1/2012 | Madawala et al. |
| 2012/0038220 | A1 | 2/2012 | Kim et al. |
| 2012/0049640 | A1 | 3/2012 | Ichikawa et al. |
| 2012/0049642 | A1 | 3/2012 | Kim et al. |
| 2012/0091989 | A1 | 4/2012 | Uramoto et al. |
| 2012/0146425 | A1 | 6/2012 | Lee et al. |
| 2012/0161538 | A1 | 6/2012 | Kinoshita et al. |
| 2012/0223590 | A1 | 9/2012 | Low et al. |
| 2012/0242164 | A1 | 9/2012 | Teggatz et al. |
| 2012/0242284 | A1 | 9/2012 | Wheatley, III et al. |
| 2012/0306284 | A1 | 12/2012 | Lee et al. |
| 2012/0306285 | A1* | 12/2012 | Kim .................. H02J 17/00 307/104 |
| 2013/0070621 | A1 | 3/2013 | Marzetta et al. |
| 2013/0076154 | A1 | 3/2013 | Baarman et al. |
| 2013/0093390 | A1 | 4/2013 | Partovi |
| 2013/0099807 | A1 | 4/2013 | Wheeland et al. |
| 2013/0113299 | A1 | 5/2013 | Von Novak et al. |
| 2013/0181536 | A1 | 7/2013 | Bhargawa et al. |
| 2013/0207468 | A1* | 8/2013 | Wu .................. H01F 38/14 307/31 |
| 2013/0229065 | A1 | 9/2013 | Robertson et al. |
| 2013/0272044 | A1 | 10/2013 | Boys et al. |
| 2013/0300357 | A1 | 11/2013 | Mercier et al. |
| 2013/0310630 | A1 | 11/2013 | Smith et al. |
| 2014/0021795 | A1 | 1/2014 | Robertson et al. |
| 2014/0028110 | A1 | 1/2014 | Petersen et al. |
| 2014/0097791 | A1 | 4/2014 | Lisuwandi |
| 2014/0159500 | A1 | 6/2014 | Sankar et al. |
| 2015/0180265 | A1 | 6/2015 | Chiang et al. |
| 2015/0200601 | A1* | 7/2015 | Sagneri .............. H02M 3/158 363/21.14 |
| 2015/0236757 | A1* | 8/2015 | Lee .................. H04B 5/0037 320/108 |
| 2015/0333800 | A1* | 11/2015 | Perry .................. G10K 11/346 320/108 |
| 2016/0043562 | A1 | 2/2016 | Lisi et al. |
| 2016/0043590 | A1* | 2/2016 | Ha .................. H02J 7/025 320/108 |
| 2016/0064997 | A1* | 3/2016 | Hur .................. H02J 7/04 320/108 |
| 2017/0118543 | A1 | 4/2017 | Ha et al. |
| 2017/0126071 | A1 | 5/2017 | Aioanei |
| 2019/0165573 | A9 | 5/2019 | Perreault et al. |

FOREIGN PATENT DOCUMENTS

| | | |
|---|---|---|
| WO | WO 2009/111597 A2 | 9/2009 |
| WO | WO 2009/111597 A3 | 9/2009 |
| WO | WO 2009/149464 A2 | 12/2009 |
| WO | WO 2012/037279 A1 | 3/2012 |
| WO | WO 2012/112703 A1 | 8/2012 |
| WO | WO 2013/006068 A1 | 1/2013 |
| WO | WO 2013/059300 A2 | 4/2013 |

OTHER PUBLICATIONS

Desai, et al.; "Energy-Efficient Wireless Power Transmitters and Receivers;" MTL Annual Research Report 2015; http://www.mtl.mit.edu/research/annual_reports/2015/circuits.pdf; Aug. 2015; 1 Page.

Desai, et al.; "A Resonant Receiver with Maximum-Efficiency Tracking for Device-to-Device Wireless Charging;" 2.02; MTL Annual Research Conference 2016, Session 2: Circuits and Systems; Poster and Abstract; Jan. 21, 2016; 2 Pages.

Desai, et al.; "Device-to-Device Wireless Charging with Maximum Efficiency Tracking;" MIT Wireless Workshop 2015; Poster; Mar. 20, 2015; 1 Page.

Desai, et al.; "A Resonant Receiver with ZVS and Maximum Efficiency Tracking for Device-to-Device Wireless Charging;" MTL Center for Integrated Circuits and Systems (CICS); PowerPoint Presentation/Research Review; Nov. 4, 2015; 17 Pages.

Li, et al.; "A Maximum Efficiency Point Tracking Control Scheme for Wireless Power Transfer Systems Using Magnetic Resonant Coupling;" IEEE Transactions on Power Electronics; vol. 30; No. 7; Jul. 2015; 11 pages.

PCT Search Report of the ISA for PCT Appl. No. PCT/US2016/045082 dated Oct. 21, 2016; 3 pages.

PCT Written Opinion of the ISA for PCT Appl. No. PCT/US2016/045082 dated Oct. 21, 2016; 10 pages.

U.S. Appl. No. 15/892,155, filed Feb. 8, 2018, Chandrakasan et al.

U.S. Appl. No. 15/892,158, filed Feb. 8, 2018, Chandrakasan et al.

Ahn et al., "Effect of Coupling Between Multiple Transmitters or Multiple Receivers on Wireless Power Transfer," IEEE Transactions on Industrial Electronics, vol. 60 No. 7; Jul. 2013; 12 Pages.

AirFuel Alliance, "AirFuel Resonant Wireless Power Transfer (WPT) System Baseline System Specification (BSS);" AFA TS-0010-0 v4.00; May 3, 2017; 88 Pages.

Azarderakhsh et al., "Efficient Algorithm and Architecture for Elliptic Curve Cryptography for Extremely Constrained Secure Applications," IEEE Transactions on Circuits and Systems—I: Regular Papers, vol. 61, No. 4; Apr. 2014; 12 Pages.

Baker et al., "Feedback Analysis and Design of RF Power Links for Low-Power Bionic Systems;" IEEE Transactions on Biomedical Circuits and Systems, vol. 1, No. 1, Mar. 2007; pp. 28-38; 11 Pages.

Batina et al., "An Elliptic Curve Processor Suitable for RFID-Tags," IACR Cryptology; Nov. 2016; 17 Pages.

Bernstein et al., "Analysis and Optimization of Elliptic-Curve Single-Scalar Multiplication," Contemporary Mathematics, vol. 461, No. 461; Jan. 2008; 19 Pages.

Beth et al., "Algorithm Engineering for Public Key Algorithms," IEEE Journal on Selected Areas in Communication, vol. 7, No. 4; May 1989; 9 Pages.

Cannon et al., "Magnetic Resonant Coupling as a Potential Means for Wireless Power Transfer to Multiple Small Receivers," IEEE Transactions on Power Electronics, vol. 24, No. 7; Jul. 2009; 7 Pages.

Casanova et al., "A Loosely Coupled Planar Wireless Power System for Multiple Receivers," IEEE Transactions on Industrial Electronics, vol. 56, No. 8; Aug. 2009; 9 Pages.

(56) References Cited

OTHER PUBLICATIONS

Cheng et al., "A 6.78 MHz 6 W Wireless Power Receiver with a 3-Level 1 x / ½ x / 0x Reconfigurable Resonant Regulating Rectifier," IEEE International Solid-State Circuits Conference (ISSCC); Jan. 2016; 3 Pages.
Choi et al., "A Current-Mode Wireless Power Receiver with Optimal Resonant Cycle Tracking for Implantable Systems," IEEE International Solid-State Circuits Conference (ISSCC), Dig. Tech. Papers, Jan. 2016; 3 Pages.
Desai et al., "A ZVS Resonant Receiver with Maximum Efficiency Tracking for Device-To-Device Wireless Charging," $42^{nd}$ European Solid-State Circuits Conference (ESSCIRC); Sep. 2016; 4 Pages.
Desai et al., "An Actively Detuned Wireless Power Receiver with Public Key Cryptographic Authentication and Dynamic Power Allocation," IEEE International Solid-State Circuits Conference (ISSCC); Sep. 7, 2017; 3 Pages.
Desai, "Circuits for Efficient and Secure Power Delivery in Distributed Applications," Partial Fulfillment of the Requirements for the Degree of Doctor of Philosophy—Massachusetts Institute of Technology; Feb. 2017; 167 Pages.
Dietz, "Battery Authentication for Portable Power Supplies," Power Electron. Technology, vol. 32, No. 4; Apr. 2006; www.microchip.com; 8 Pages.
Doughty et al., "A General Discussion of Li Ion Battery Safety," The Electrochemical Society Interface, vol. 21, No. 2; Jun. 2012; 8 Pages.
Furtner et al., "BIF-Battery Interface Standard for Mobile Devices," Proceedings of the Custom Integrated Circuits Conference (CICC); Sep. 2013; 8 Pages.
Hwang et al., "An All-In-One (Qi, PMA and A4WP) 2.5W Fully Integrated Wireless Battery Charger IC for Wearable Applications," IEEE International Solid-State Circuits Conference (ISSCC); Dig. Tech. Papers; Jan. 2016; 3 Pages.
Jin et al., "Rapid Wireless Charging with an Energy-Constrained Source;" SuperURP; MIT, EECS; Poster Displayer at Poster Session; Dec. 6, 2012; 1 Page.
Jin et al., "Wirelessly Charging Portable Electronics using Mobile Devices," PowerPoint Presentation: http://video.mit/edu/watch/wireless-charging-with-an-energy-constrained-source-presented-bye-superurop-student-rui-jin-13573/; Jan. 17, 2013; 9 Pages.
Juvekar et al., "A Keccak-Based Wireless Authentication Tag with Per-Query Key Update and Power-Glitch Attack Countermeasures," IEEE International Solid-State Circuits Conference (ISSCC); Dig. Tech. Papers; Jan. 2016; 3 Pages.
Kendir, et al., "An Optimal Design Methodology for Inductive Power Link With Class-E Amplifier," IEEE Transactions on Circuits and Systems—I: Regular Papers; vol. 52, No. 5; May 2005; 10 Pages.
Kim et al., "Design of a Contactless Battery Charger for Cellular Phone," IEEE Transactions on Industrial Electronics, vol. 48, No. 6; Dec. 2001; pp. 1238-1247; 10 Pages.
Kurs et al., "Wireless Power Transfer Via Strongly Coupled Magnetic Resonances," Research Article in Science, vol. 317, No. 5834; www.sciencemag.org; Jul. 2007; 4 Pages.
Lee et al., "Efficient Power-Analysis-Resistant Dual-Field Elliptic Curve Cryptographic Processor Using Heterogeneous Dual-Processing-Element Architecture," IEEE Transactions on Very Large Scale Integration (VL5I) Systems, vol. 22, No. I; Jan. 2014; 13 Pages.
Li et al., "Wireless Power Transfer System Using Primary Equalizer for Coupling—and Load-Range Extension in Bio-Implant Applications," IEEE International Solid-State Circuits Conference (ISSCC); Dig. Tech. Papers; Feb. 2015; 3 Pages.
Moh et al., "A Fully Integrated 6W Wireless Power Receiver Operating at 6.78 MHz with Magnetic Resonance Coupling," IEEE International Solid-State Circuits Conference (ISSCC); Dig. Tech. Papers; Feb. 2015; 3 Pages.

National Institute of Standards and Technology (NIST), "Digital Signature Standard (DSS)," Information Technology Laboratory; Document FIPS PUB 186-4, Federal Information Processing Standards Publication; Jul. 2013; 130 Pages.
New York Times; "Push for Standard Cellphone Charger Gains Ground;" Article in http://www.nytimes.com/2009/02/17/technology/17iht-chargers.4.20250284.html?_r=0 published on Nov. 7, 2009; 1 Page.
Pessi et al., "Curved Tags—A Low-Resource ECDSA Implementation Tailored for RFID", Conference Paper from International Workshop on Radio Frequency Identification: Security and Privacy Issues (RFIDSec); Nov. 15, 2014; 17 Pages.
Reyhani-Masoleh, "Efficient Algorithms and Architectures for Field Multiplication Using Gaussian Normal bases," IEEE Transactions on Computers, vol. 55, No. 1; Jan. 2006; 14 Pages.
Roy et al., "Lightweight Coprocessor for Koblitz Curves: 283-Bit ECC Including Scalar Conversion with Only 4300 Gates," International Workshop on Cryptographic Hardware and Embedded Systems (CHES 2015); Sep. 2015; 21 Pages.
Sokal, "Class-E Switching-Mode High-Efficiency Tuned RF/Microwave Power Amplifier: Improved Design Equations;" IEEE MTT-S International Microwave Symposium Digest, vol. 2; Jun. 2000; 4 Pages.
Solinas, "Efficient Arithmetic on Koblitz Curves," Designs, Codes and Cryptography, vol. 19, Issue 2-3; pp. 195-209; Mar. 2000; 55 Pages.
Texas Instruments, "bq26100 SHA-1/HMAC Based Security and Authentication IC With SDQ Interface," Jun. 2006, Revised Aug. 2015; 29 Pages.
Wang et al., "Design and Analysis of an Adaptive Transcutaneous Power Telemetry for Biomedical Implants;" IEEE Transactions on Circuits and Systems—I: Regular Papers, vol. 52, No. 10; Oct. 2005; pp. 2109-2117; 9 Pages.
Wenger, "Hardware Architectures for MSP430-Based Wireless Sensor Nodes Performing Elliptic Curve Cryptography," International Conference on Applied Cryptography and Network Security (ACNS 2013); Jun. 2013; 17 Pages.
Xing et al., "Battery Management Systems in Electric and Hybrid Vehicles," Journal in Energies, vol. 4, No. 11; Published Oct. 31, 2011; pp. 1840-1857; 18 Pages.
Zaghib et al., "Safe and Fast-Charging Li-Ion Battery with Long Shelf Life for Power Applications," Journal of Power Sources, vol. 196, No. 8; Apr. 2011; 6 Pages.
PCT International Search Report and Written Opinion dated Apr. 15, 2013 for International Application No. PCT/US2012/060590 (WO 2013/059300 A2); 10 Pages.
PCT International Search Report and Written Opinion dated Apr. 23, 2015 for International Application No. PCT/US2014/066268; 9 Pages.
PCT International Preliminary Report on Patentability dated Jun. 7, 2016 for International Application No. PCT/US2014/066268; 6 Pages.
U.S. Non-Final Office Action dated Oct. 5, 2017 for U.S. Appl. No. 14/911,599; 15 Pages.
Response to U.S. Non-Final Office Action dated Oct. 5, 2017 for U.S. Appl. No. 14/911,599; Response filed Dec. 18, 2017; 12 Pages.
U.S. Final Office Action dated Feb. 6, 2018 for U.S. Appl. No. 14/911,599; 8 Pages.
Response to U.S. Final Office Action dated Feb. 6, 2018 for U.S. Appl. No. 14/911,599; Response filed Aug. 6, 2018; 7 Pages.
U.S. Notice of Allowance dated Aug. 30, 2018 for U.S. Appl. No. 14/911,599; 5 Pages.
PCT International Search Report and Written Opinion dated Apr. 26, 2019 for International Application No. PCT/US2019/015811; 11 Pages.
PCT International Search Report and Written Opinion dated May 8, 2019 for International Application No. PCT/US2019/015814; 9 Pages.

* cited by examiner

EFFICIENCY MAXIMIZATION FOR DEVICE-TO-DEVICE WIRELESS CHARGING

CROSS-REFERENCE TO RELATED APPLICATIONS

This application claims the benefit under U.S.C. § 119(e) of U.S. Provisional Application No. 62/200,168 filed Aug. 3, 2015, titled "EFFICIENCY MAXIMIZATION FOR DEVICE-TO-DEVICE WIRELESS CHARGING", which is incorporated herein by reference in its entirety.

BACKGROUND

As is known in the art, the advent of wearable electronics has dramatically shifted energy vs. functionality trade-off characteristic for battery-powered systems. With ever-shrinking device sizes and slow growth in battery energy density, many devices either need recharging multiple times in a single day or must compromise heavily on functionality to limit power usage. Thus, in order to overcome battery life limitations of devices having relatively small batteries (e.g. activity trackers), such devices can be charged multiple times per day using another device having a larger battery (e.g. a cell phone) as a charging source.

As is also known, among wireless charging techniques, wireless charging through inductive coupling is a relatively efficient technique. It would, however, be desirable to improve the efficiency of wireless charging through inductive coupling.

SUMMARY

In accordance with the concepts, systems, circuits and techniques described herein, it has been recognized that a device-to-device wireless charging system which maximizes end-to-end power efficiency (rather than output power) is desirable.

In one embodiment, a receiver includes a rectifier circuit configured to be coupled to an inductive element, a dc-to-dc converter coupled between the rectifier and a chargeable load (e.g. a chargeable battery) and a maximum efficiency tracker which dynamically tracks a maximum efficiency point and which is coupled to the dc-dc converter to control a duty cycle of the converter.

With this particular arrangement, a technique for maximizing end-to-end efficiency (rather than output power) in a device-to-device wireless charging system using an inductive link is provided. In one embodiment, a resonant rectifier circuit topology appropriate for use in applications using resonant energy transfer through an inductive link is described. The resonant rectifier circuit topology reduces (and ideally minimizes) a number of switches required to maintain a near-square wave voltage across the switch. In preferred embodiments, the rectifier uses a single switch.

In accordance with a further aspect of the concepts described herein, a receiver for use in a device-to-device wireless charging system utilizing inductive coupling through an inductive element to charge a load, includes a capacitor coupled between the inductive element (e.g. a receiver coil) and a rectifier circuit having a pair of input terminals configured to be coupled to the inductive element and a pair of output terminals. Power is coupled from the receiver coil to the rectifier, through the capacitor which is provided having a capacitance value selected to resonate with the inductance of the receiver coil. The receiver further includes a converter circuit having a pair of input terminals coupled to the output terminals of said rectifier circuit and having a pair of output terminals configured to be coupled to the load, and an efficiency processor coupled to dynamically determine input voltage and current signals of said rectifier and to use the determined input voltage and current signals to generate an efficiency value used to control said converter such that an impedance looking into the rectifier input terminals corresponds to an impedance which substantially maximizes efficiency of power transfer through inductive coupling to the receiver and wherein said efficiency processor utilizes only a pre-characterized (e.g. pre-measured) value of a receiver coil (e.g. receiver coil resistance) and dynamically determined values which are fully measurable in the receiver.

With this particular arrangement, a receiver for maximizing end-to-end efficiency (rather than output power) in a device-to-device wireless charging system using an inductive link is provided. The maximum (or nearly maximum) efficiency is achieved by measuring values only in the receiver. Significantly, the variables needed to efficiently perform wireless charging capability using an inductive link are fully measurable in the receiver alone. Thus, there is no need for a communication layer between a transmitter (i.e. a power source) and a receiver (i.e. a load to be charged).

In one embodiment, the efficiency processor generates an efficiency value by computing an efficiency value according to:

$$\eta \propto k \times (V_L/(R_2+R_L))$$

in which:
k is a coupling coefficient of the inductive coupling;
$V_L$ is a voltage across the rectifier circuit;
$R_2$ is a resistance of the inductive element; and
$R_L$ is an impedance at the input terminals of rectifier circuit.

In one embodiment, the efficiency processor computes the impedance at the input terminals of said rectifier circuit $R_L$ according to:

$$R_L = V_L/I_L$$

in which:
$V_L$ corresponds to an ac amplitude of a voltage across the input terminals of the rectifier circuit; and
$I_L$ corresponds to an ac amplitude of a current into the rectifier circuit.

In one embodiment, processor generates an efficiency value by dynamically computing an efficiency value.

In one embodiment, the efficiency processor controls the input impedance of said rectifier by controlling a duty cycle of said converter.

In one embodiment, the receiver further includes a duty cycle controller coupled between the efficiency processor and the converter and the efficiency processor provides signals to the duty cycle controller and in response thereto, the duty cycle controller controls a duty cycle of the converter and the duty cycle of the converter controls the impedance looking into the rectifier input terminals.

It should be appreciated that the circuits, systems and techniques described herein may include one or more of the following features independently or in combination with another feature and that elements of different embodiments described herein may be combined to form other embodiments which may not be specifically set forth herein.

BRIEF DESCRIPTION OF THE DRAWINGS

The foregoing features may be more fully understood from the following description of the drawings in which.

DETAILED DESCRIPTION

Described herein are concepts, systems, circuits and related techniques for wireless charging through inductive coupling between two or more devices.

Figure 1:
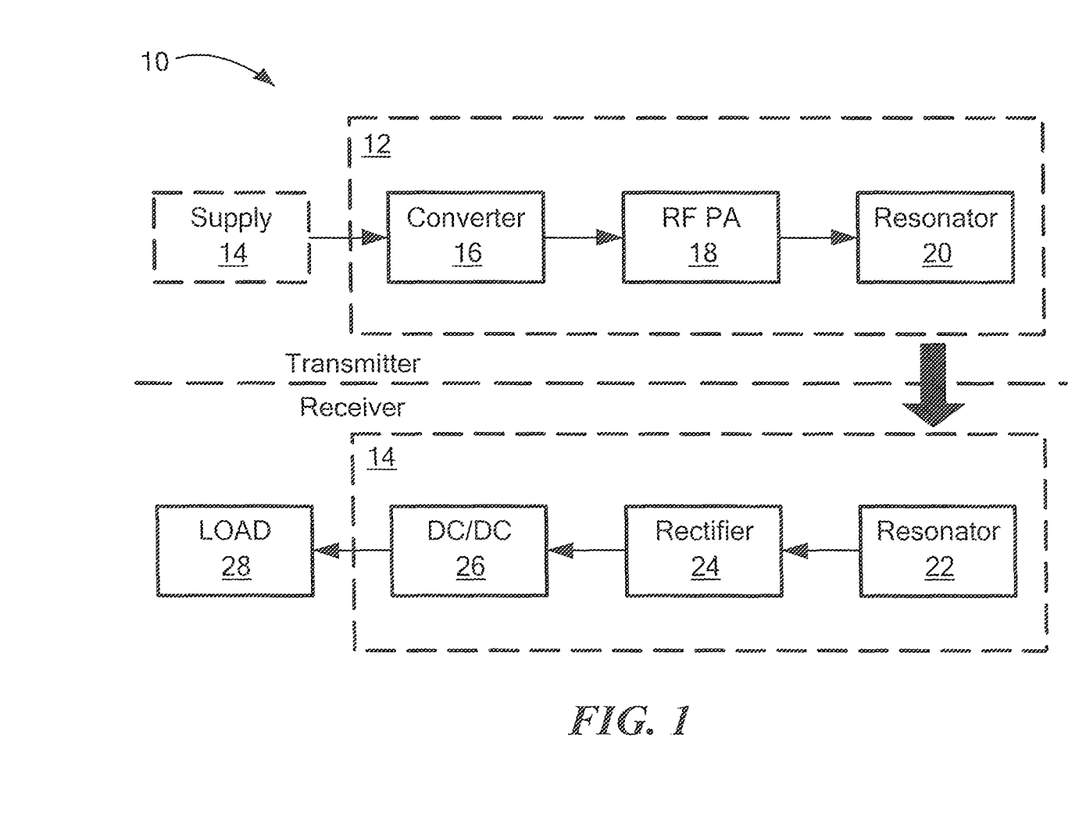
FIG. 1 is a block diagram of a wireless charging system.

Referring now to FIG. 1, a wireless system 10 having a wireless charging capability includes a transmitter 12 in wireless communication with a receiver 14. In the system of FIG. 1, power is transferred from transmitter 12 to receiver 14 via resonant inductive coupling. Significantly, and as will become apparent from the description provided herein below, the variables needed to efficiently perform wireless charging capability using an inductive link are fully measurable on the receive side alone after characterizing a resonant-tuned coil in the receiver 14. Thus, an efficiency calculation may be made using variables which are fully measurable in the receiver 14 alone. Accordingly, as evident from FIG. 1, there is no need for a communication layer between a transmitter and a receiver (e.g. such as transmitter 12 and receiver 14 in FIG. 1) to perform wireless charging and in particular to control power delivery between the transmitter and receiver.

Transmitter 12 receives power from a energy source such as a power supply 14 (here shown in phantom since in some embodiments the energy source may not properly be a part of transmit-receive system 10). Power supply 14 may correspond to a battery or a constant 5V supply from a USB port, for example. Other sources are, of course, also possible. At some points in time transmitter 12 may be coupled to either or both of a battery or constant supply.

In this illustrative embodiment, transmitter 12 includes a power converter circuit 16 (e.g. a buck converter) having an input configured to couple to source 14 and having an output coupled to an input of a radio frequency (RF) amplifier 18. In preferred embodiments of transmitter 12, RF amplifier 18 is provided as an RF power amplifier (PA). An output of RF PA 18 is coupled to a transmit resonant-tuned coil 20.

Transmit resonator 20 receives the RF energy provided thereto from amplifier 18 and emits an RF signal 21 which is received by receiver 14 via a receive resonant-tuned coil 22. Thus, system 10 utilizes resonant energy transfer through an inductive link provided by transmit and receive resonant-tuned coils 20, 22. Transmit and receive resonant-tuned coils 20, 22 may be provided, for example, as transmitter and receiver coils connected to a tuning capacitor, as will be described below.

In receiver 14, a rectifier 24 receives RF signals from resonator 22 and provides rectified signals to a dc-dc converter 26 which may include an impedance control means in the form of a maximum efficiency tracker as will be described in detail below.

An output of dc-dc converter 26 is coupled to a load to be charged 28. Load 28 may, for example, be provided as a capacitor (e.g. a super capacitor) or a battery or other device which can receive and/or store charge or power.

The efficiency obtained through the resonant energy transfer of an inductive link is a function of a coupling coefficient (denoted k) and a load impedance (e.g. an impedance of load 28 in FIG. 1), among other parameters. It should be appreciated that for a given transmitter/receiver pair, the only factors that affect the efficiency across multiple uses and within the same charging cycle are the coupling coefficient and load resistance $R_L$. Given a certain (i.e. substantially fixed) relative placement (e.g. spacing) between transmit and receive resonators 20, 22, the value of the coupling coefficient k between the resonators is substantially fixed. Hence, one option available to tune (e.g. to improve) the efficiency is to change the load impedance.

Unfortunately, the value of the load impedance (i.e. impedance of load 28) that maximizes efficiency depends, at least in part, upon the coupling coefficient k between the transmitter 12 and receiver 14 (or more particularly between transmit and receive resonators 20, 22). This necessitates constant tracking of the coupling and adjusting the load impedance to achieve a maximum obtainable efficiency. This is accomplished via the maximum efficiency tracker. It should be appreciated that in a battery charging implementation, the load impedance $R_L$ is often that of a rectifier (e.g. rectifier 24 in FIG. 1).

Figure 2:
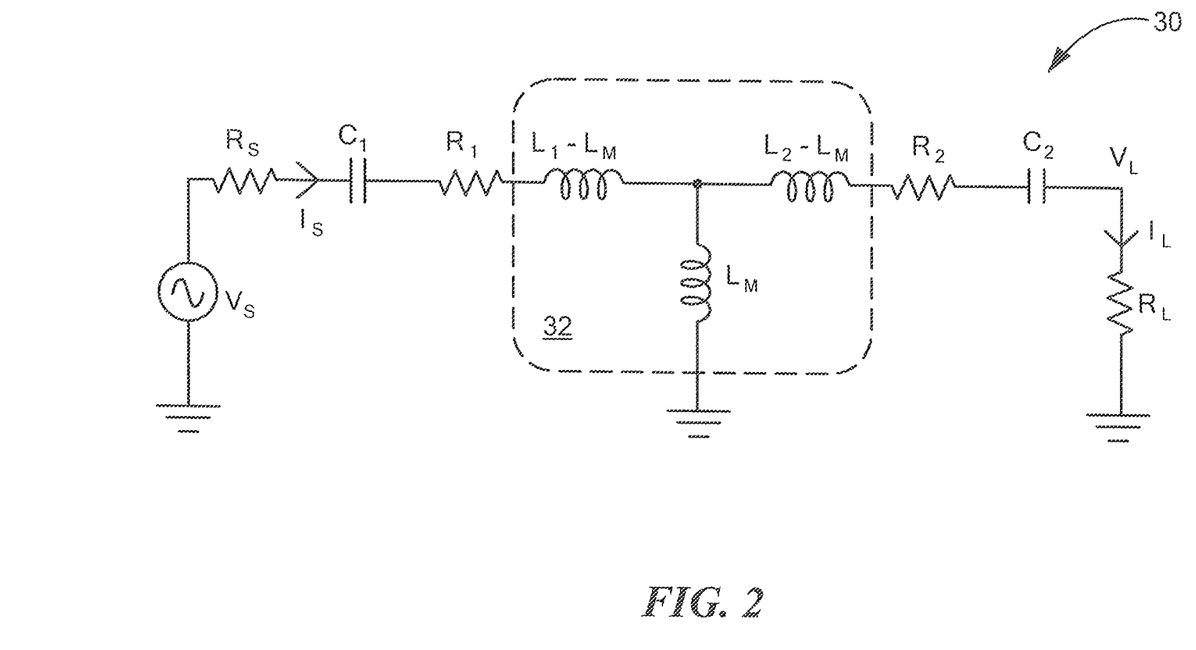
FIG. 2 is a schematic diagram of a model of coupled resonators.

Referring now to FIG. 2, a model of resonant energy transfer through an inductive link (e.g. a pair of inductive elements such as inductors $L_1$, $L_2$ such as may be included in transmitter and receiver resonators 20, 22 described above in conjunction with FIG. 1) which allows adjusting the load to achieve the maximum obtainable efficiency includes a resistor $R_s$ representative of a resistance characteristic of a source (such as source 14 described above in conjunction with FIG. 1, for example) serially coupled with capacitor $C_1$ and resistor $R_1$ The resistance is a characteristic of the inductor and the capacitor $C_1$ would be an additional component to tune out the inductance of the coil included in a transmitter resonator (such as resonant-tuned coil 20 described above in conjunction with FIG. 1). Components generally denoted with reference numeral 32 represent the two coupled inductive elements $L_1$, $L_2$, as is generally known. The model further includes a resistor $R_2$ representative of a resistance characteristic of a receiver coil and a second tuning capacitor $C_2$ to tune out the inductance of the coil included in a receiver resonator (such as resonant-tuned coil 22 described above in conjunction with FIG. 1). A resistor $R_L$ is representative of a resistance characteristic of a load (such as load 28 described above in conjunction with FIG. 1, for example)

Using the model of FIG. 2, the following expression (Eq. 1) for efficiency η can be derived:

$$\eta = (V_L \times I_L)/(V_s \times I_s) \propto V_L \times (X_{LM}/(R_2+R_L))$$

$$\eta \propto k \times (V_L/(R_2+R_L)) \qquad \text{Eq.1}$$

in which:

k is a coupling coefficient;

$V_L$ is a voltage across a load;

$R_2$ is a resistance of a receiver coil; and $R_L$ is a resistance of a load.

The coupling coefficient can be treated as quasi-static but reflecting changes with environmental variables such as coil-to-coil distance, orientation, etc. A resistance value for $R_2$ may be obtained, for example, by characterizing an inductive elements (e.g. a coil) to be used in a receiver (e.g. in receiver resonator 22 in FIG. 1). Equation 1 may be used to compute a value representative of efficiency η.

Significantly, in Equation 1 the variables are fully measurable on the receive side alone and thus there is no need for a communication layer between a transmitter and a receiver (e.g. such as transmitter 12 and receiver 14 in FIG. 1) to control power delivery between the transmitter and receiver. Thus, an efficiency calculation may be made using variables which are fully measurable on the receive side alone.

The usefulness of such an efficiency characteristic will be described in further detail below in conjunction with FIG. 4.

Figure 3:
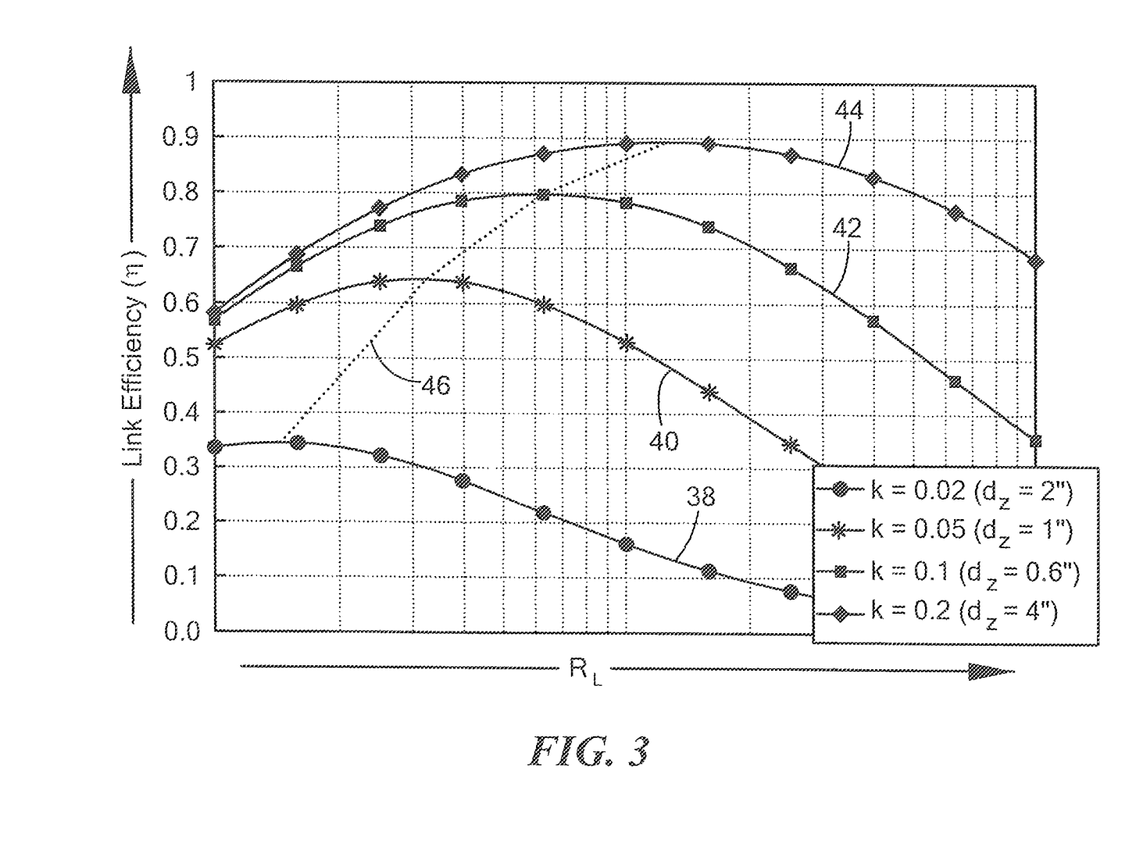
FIG. 3 is a plot of link efficiency vs. load impedance.

Referring now to FIG. 3, a plot of load impedance ($R_L$) vs. link efficiency (η) includes curves 38-42 each of which corresponds to an efficiency characteristic at a different coupling value k. It should be appreciated that each of the coupling values k corresponds to a spacing between a transmitter and receiver (or more specifically a spacing between an example implementation of a transmitter resonator and a receive resonator such as transmitter and receiver resonators 20, 22 described above in conjunction with FIG. 1). For example, curve 38 corresponds to an efficiency curve for a coupling value k of 0.02 which corresponds to a spacing $d_z$ of two (2) inches (e.g. spacing between the example transmitter and receiver resonators 20, 22, FIG. 1). Similarly, curve 40 corresponds to an efficiency curve for a coupling value k of 0.05 which occurs at a spacing $d_z$ of one (1) inch. Similarly, curve 42 corresponds to an efficiency curve for a coupling value k of 0.1 which occurs at a spacing $d_z$ of (0.6) inch. Similarly, curve 44 corresponds to an efficiency curve for a coupling value k of 0.2 which occurs at a spacing $d_z$ of 0.4 inches. Maximum efficiency values for each of the curves 38-44 are indicated by line 46. The maximum efficiency values correspond to the values at which wireless power transfer should ideally occur between a transmitter and receiver. It should be noted that values of maximum efficiency are different for different values of the coupling value k (i.e. the different curves for each coupling value lead to different maximum efficiency points).

Figure 4:
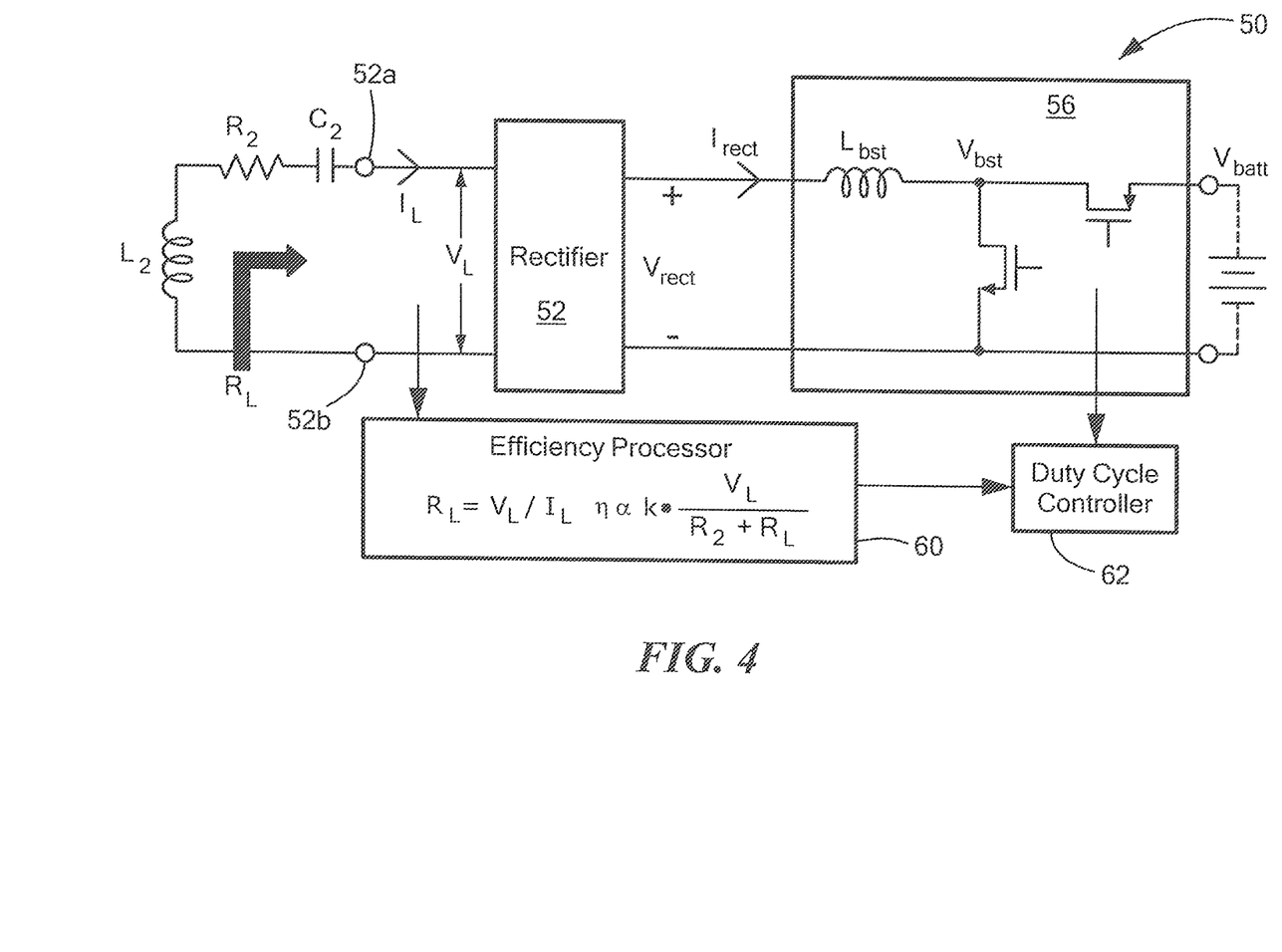
FIG. 4 is a block diagram of a receive system which maximizes end-to-end power efficiency.

Referring now to FIG. 4, a receiver 50 includes an inductive element $L_2$ (e.g. a coil) which inductively receives power from a transmitter (such as the transmitter 12 described above in conjunction with FIG. 1). Power signals received via coil $L_2$ are coupled through a capacitor $C_2$ to a rectification circuit 52 (or rectifier 52). Rectifier may be provided as any type of rectifier including, but not limited to, the types described below in conjunction with FIGS. 5 and 5A. It should be appreciated that the input impedance seen at terminals 52a, 52b may be expressed as:

$$R_L = V_L/I_L$$

in which:

$R_L$ corresponds to the receive side impedance;

$V_L$ corresponds to the ac voltage across an input of rectifier 52; and $I_L$ corresponds to the ac current into rectifier 52.

Rectifiers, being non-linear circuits, present a changing value of resistance as both the input ac voltage swing and output dc voltage change with different coupling values k and changes in the load (e.g. a varying state of charge of a battery, for example) respectively. As noted above in conjunction with FIG. 2, Equation 1 is an expression for the end-to-end efficiency η that is completely measurable at the receiver is obtained.

A dc-dc converter circuit 56 is coupled to the output of the rectifier 52 so as to receive a rectified signal there from. In one embodiment the converter may be provided as a boost converter. The dc-to-dc converter coupled between the rectifier and load (e.g. a battery or super capacitor, for example) allows for varying effective load impedance $R_L$ (i.e. the impedance as seen by the inductive element $L_2$) based upon the measured efficiency by controlling the dc voltage at the output of the rectifier.

The converter is controlled such that the impedance looking into the rectifier corresponds to an impedance which will result in a maximum (or nearly maximum) efficiency. Thus, ideally, the impedance seen looking into the rectifier ($R_L$) at any point in time is the impedance which maximizes (or nearly maximizes) efficiency (e.g. as shown in FIG. 3).

Efficiency processor 60 determines an efficiency value or a value representative of an efficiency. In preferred embodiments, Equation 1 may be used to calculate or otherwise determine the value of $R_L$. In some embodiments, this is done dynamically (i.e. "on-the-fly") while on other embodiments other techniques may be used. Thus, efficiency processor provides a maximum value to the duty cycle controller 62.

This may be done in two parts. (1) Equation 2 (i.e. $R_L = V_L/I_L$) may be used to calculate the optimum value of $R_L$ on the fly (done by efficiency processor 60); (2) and because the exact value of the coupling coefficient k is not known, an iterative process may be used to determine a maximum efficiency point. It should be appreciated that the efficiency calculation itself may not yield the precise efficiency values (because a precise value for the coupling coefficient k may not be known), however, it is possible to compare the relative values and select the maximum efficiency point (i.e. the largest value of all values computed by efficiency processor 60).

The efficiency value produced by efficiency processor is then provided to duty cycle controller 62. In response to the signal provided thereto from efficiency processor 60, duty cycle controller 62 changes the duty cycle of converter by a corresponding amount (either an increase in duty cycle, a decrease in duty cycle or not change in duty cycle).

If the newly adjusted duty cycle results in an increased efficiency value, then the change was in the correct direction. If the newly adjusted duty cycle results in a decreased efficiency, then the change was in the wrong direction and a suitable correction is made. Thus, a feedback control loop including at least efficiency processor 60 and duty cycle controller 62 is used to adjust a duty cycle of the converter using an iterative process such that the impedance looking into the rectifier corresponds to an impedance which will result in a maximum (or nearly maximum) efficiency. Thus, the efficiency value is used to aid in determining whether the duty cycle is being adjusted in a manner which leads to a maximum (or near maximum) efficiency.

The rectifier provides a rectified voltage signal $V_{rect}$ to the input of a converter circuit 56 (or more simply "converter 56"). In one embodiment, converter 56 may be provided as a boost converter. Converter 56 receives the signals provided thereto and provides a level adjusted signal to a load, which in this illustrative embodiment is shown as a battery. Load 57 is shown in phantom since it is not properly a part of the receiver circuit 50.

In response to signals received by coil $L_2$, an instantaneous impedance value $R_L$ is computed using the voltage across $V_L$ and current $I_L$ into rectifier 52. The impedance value may be dynamically computed or stored in a lookup table. The impedance value is then provided to a processor which computes, determines or otherwise performs an efficiency calculation using Equation 1 above.

The efficiency calculation may be used to determine maximum or substantially maximum efficiency values depending upon the state of the receiver. The efficiency values are used to control regulator 56 such that the efficiency is maximized for device-to-device wireless charging. In one particular embodiment, converter 56 is provided as a boost converter and the efficiency values are used to determine a duty ratio of a pair of switches in the boost converter.

Figure 5:
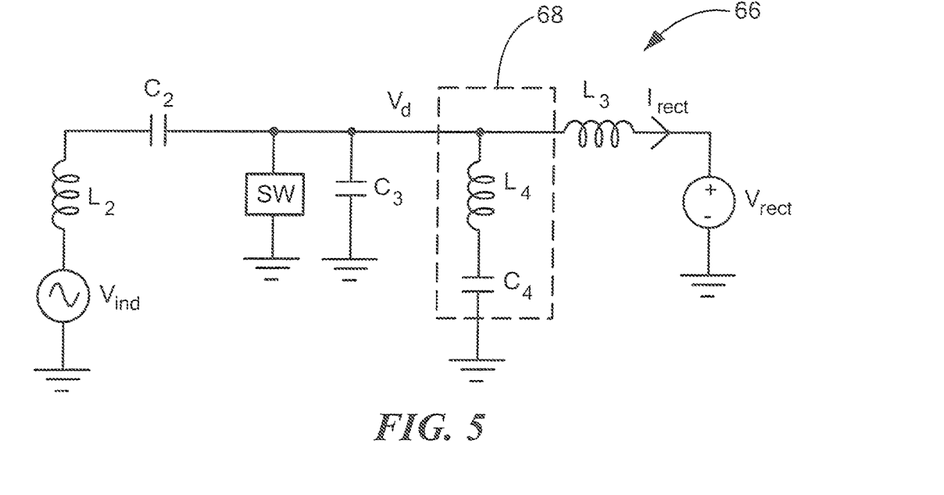
FIG. 5 is a schematic diagram of a class-$\phi_2$ rectifier topology suitable for use with a receive system of the type described in conjunction with FIG. 4.

Referring now to FIG. 5, a class-$\phi_2$ rectifier circuit 66 suitable for use in a receiver circuit such as receivers 14, 50 described above in conjunction with FIGS. 1 and 4 includes a switch element $D_1$ which may be implemented as a passive diode or as an active transistor switch, for example. Rectifier circuit 66 further includes a filter capacitor $C_3$ and an $L_4$-$C_4$ tank circuit 68 having values selected to resonate at a second harmonic frequency of the signals provided thereto via coil $L_2$. It should be appreciated that although the topology of the class-$\phi_2$ rectifier circuit 66 is generally known, use of such a circuit topology in a receiver operating in a wireless charging system is believed to be unique.

Figure 5A:
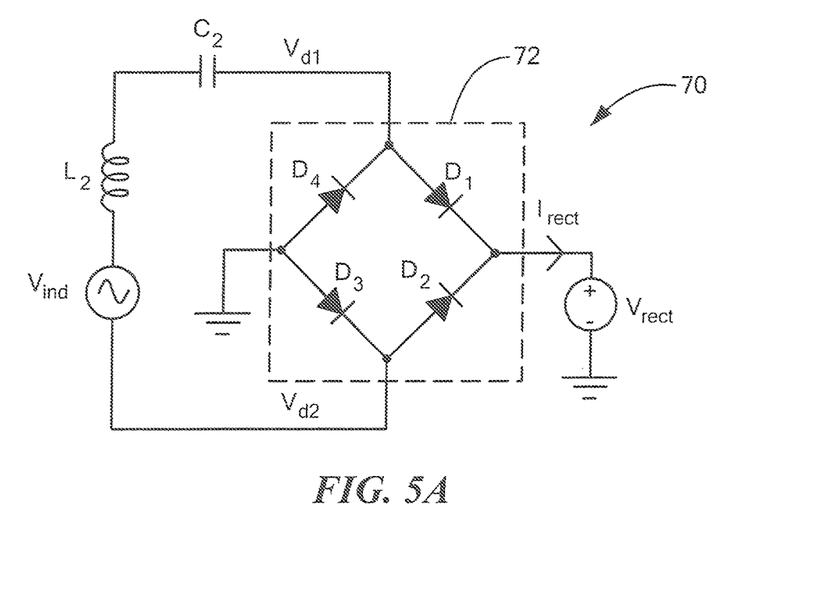
FIG. 5A is a schematic diagram of a full bridge rectifier topology suitable for use with a receive system of the type described in conjunction with FIG. 4.

Referring now to FIG. 5A, a full bridge rectifier circuit 66 suitable for use in a receiver circuit such as receivers 14, 50 described above in conjunction with FIGS. 1 and 4 includes switching elements $D_1$-$D_4$ coupled to form a bridge rectifier circuit. Switching elements $D_1$-$D_4$ may be provided as diodes (e.g. passive diodes) or as transistor switches (e.g. active switches) as is generally known. Any full bridge rectifier implementation may, of course, be used. Furthermore, other types of rectifier circuits including, but not limited, to half bridge circuits, may be used. It should be appreciated that any rectifier topology whose input impedance can be made real may be used in a receiver circuit such as receivers 14, 50 described above in conjunction with FIGS. 1 and 4.

Figure 6:
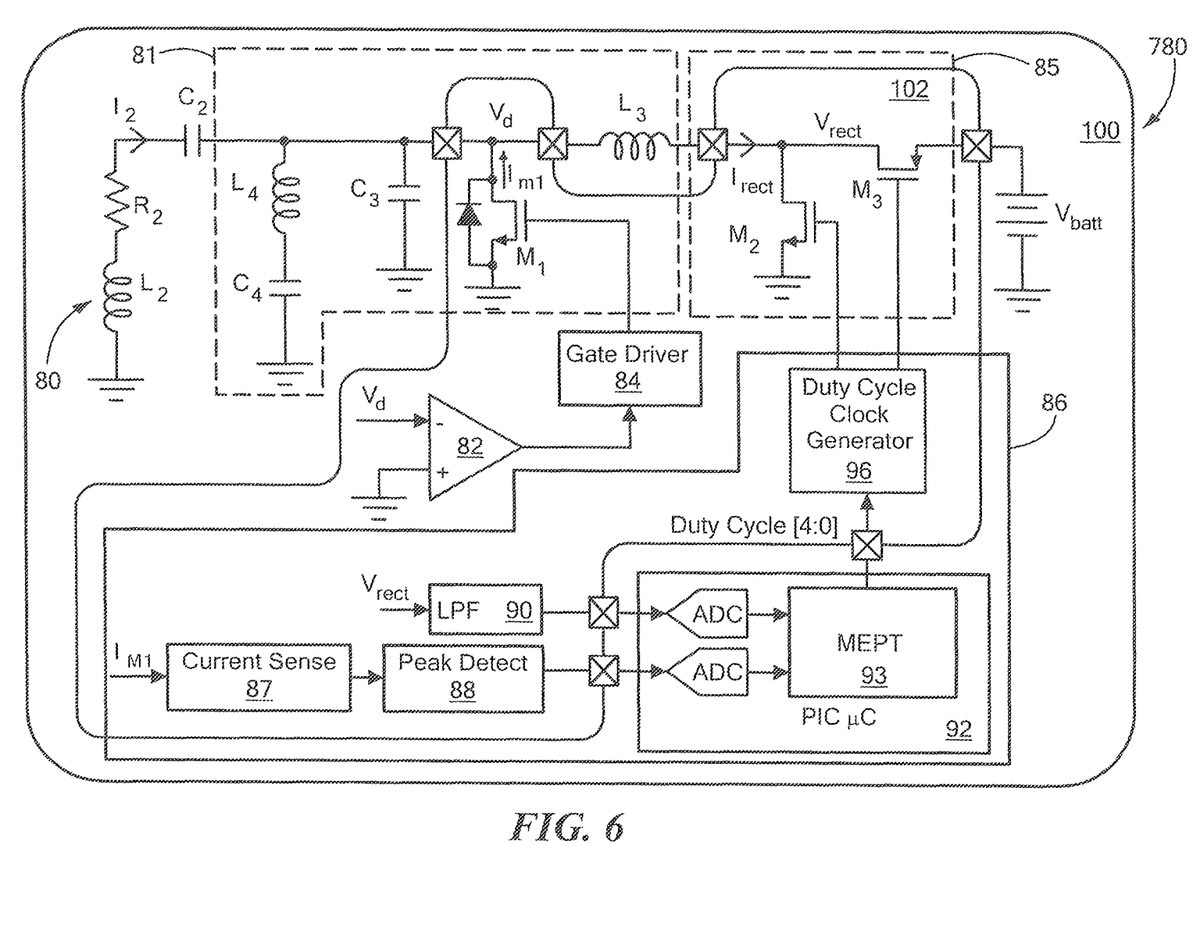
FIG. 6 is a schematic diagram of a receive system having a class-$\phi_2$ rectifier topology.

Referring now to FIG. 6, a receiver 78 includes an inductive element 80 (here illustrated as a coil having an inductance $L_2$ and a resistance $R_2$) configured to inductively receive power from a transmitter such as transmitter 12 in FIG. 1. Power is coupled from coil 80 to a rectifier 81, through a resonant capacitor $C_2$ having a capacitance value selected to resonate with the inductance $L_2$ of coil 80. Rectifier 81 is here provided as a class-$\phi_2$ rectifier circuit, comprising a tank circuit provided from inductor $L_4$ and capacitor $C_4$ that resonates at the second harmonic, a filter capacitor $C_3$ and a switch element formed from a transistor $M_1$ which may be provided as a field effect transistor (FET). The tank circuit shapes the waveform to provide a near square wave voltage across the switch $M_1$.

A control electrode of transistor $M_1$ (e.g. a gate electrode in the case of a FET) receives control signals via comparator 82 and gate driver 84. A first input of comparator 82 is coupled to a first reference potential, here illustrated as ground, and a second input of comparator 82 is coupled to receive voltage $V_d$. Thus, when the diode in parallel with switch $M_1$, which could either be a separate component or the body diode of $M_1$, turns on (i.e. is biased into its conductive state), voltage $V_d$ at comparator 82 causes the comparator 82 to provide a signal which biases transistor $M_1$ into its conductive state.

Rectifier 81 provides a suitably rectified signal to an input of a dc-dc converter 85 comprising a pair of transistors $M_2$, $M_3$. Converter 85 receives control signals (duty cycle signals) from a controller 86. Controller 86 comprises a current sense circuit 87 which divides and replicates an input signal $I_{M1}$ (here, the current flowing through transistor $M_1$) and provides an output signal having a value which is proportional to the current through switch $M_1$. The current sensor output signal is provided to an input of a peak detector 88 to obtain the ac amplitude. A rectified voltage signal $V_{rect}$ from the output of rectifier 81 is coupled through a low pass filter 90 and the output of the peak detector and low pass filtered $V_{rect}$ signal are provided to inputs of a processor 92. Processor 92 is here illustrated as a PIC microprocessor although any type of processor may be used and the signals are converted to digital signals via analog to digital converters (ADC).

Processor 92 is here illustrated as a PIC microprocessor although any type of processor may be used. Processor 92 includes one or more analog to digital converters (ADC) and signals provided to processor 92 are converted to digital signals via the ADCs. Processor 92 also implements a maximum efficiency point tracker (MEPT) 93. The digital values are provided from the ADCs to MEPT 93 which determines a maximum (or near maximum) efficiency point in the manner which may be the same as or similar to that described above in conjunction with FIG. 4. Thus, the values provided to processor 92 (and subsequently to MEPT 93) are used to determine how to change the duty cycle of controller 85.

MEPT 93 provides an output signals to a duty cycle clock generator 96 which generates a duty cycle control signal and provides the signal to the switches of converter 85. Duty cycle clock generator may include, for example, a clock generator circuit, a dead-time circuit and a transistor driver circuit. A typical range for the duty cycle values across an entire charge cycle would be in the range of about 0.4- to 1. In the illustrative embodiment of FIG. 6, a duty cycle of 1 corresponds to a boost converter output being connected to its input, (i.e. transistor $M_3$ being on all the time).

Figure 7:
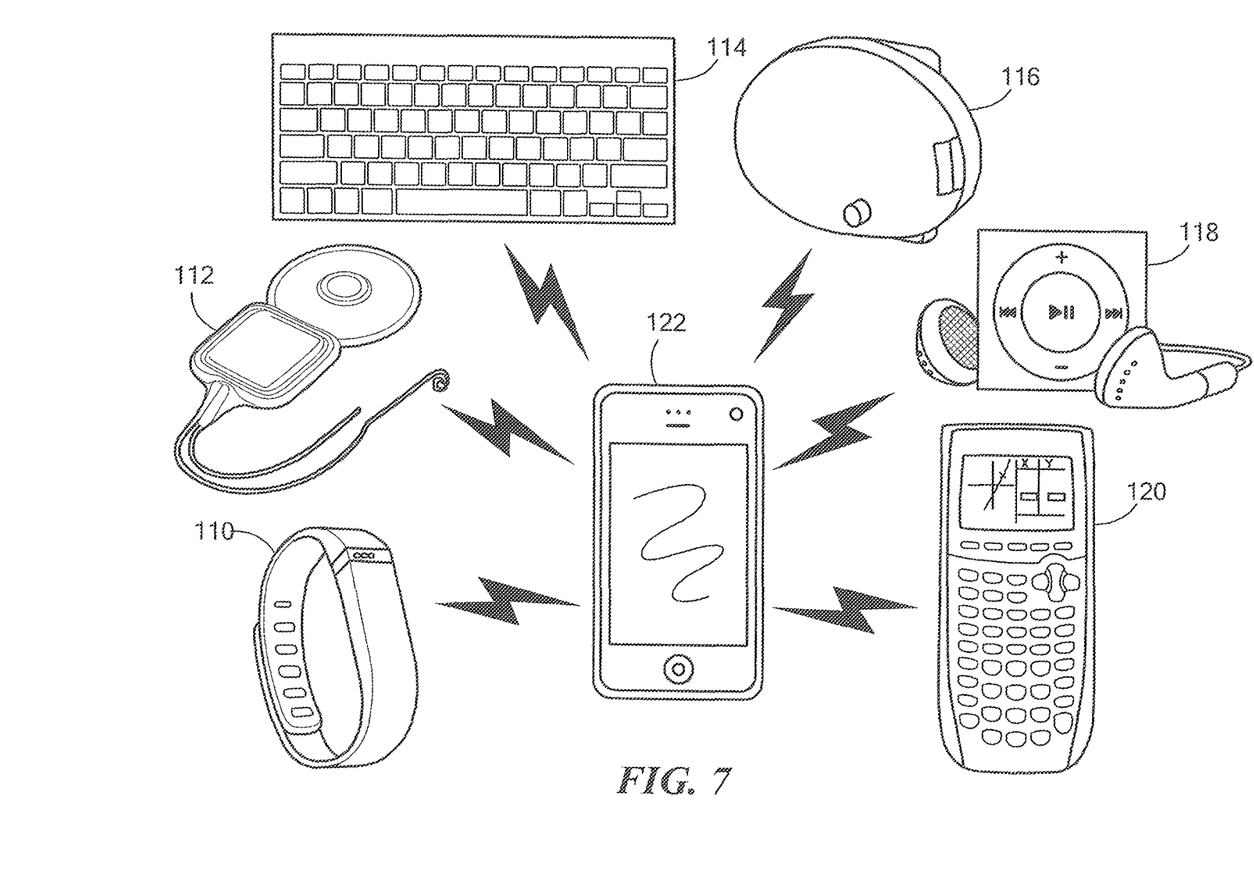
FIG. 7 is a diagram illustrating various portable devices that may benefit from wireless charging.

Referring now to FIG. 7, in terms of wireless charger receivers, there are many portable devices or wearable electronics that could be outfitted with wireless charging circuitry described herein. As used herein, the term "wearable electronics" (also referred to as "wearable technology," "wearable devices," "fashionable technology," "fashion electronics," "technology tags" (aka "tech tags") or more simply "wearables"), includes but is not limited to clothing and accessories incorporating computer and/or electronic components (including advanced electronic components). The designs often, but not always, incorporate practical functions and features. FIG. 7, for example, illustrates various portable devices that could benefit from wireless device-to-device charging. These include wearable electronics such as "smart" wristbands 110 (such as activity trackers, watches, phone accessories), medical implants such as cochlear implants 112, wireless accessories such as Bluetooth keyboards 114, outdoor electronics such as bike lights 116 and MP3 players 118, battery-operated devices such as calculators 120 or remote controls, and many others. Each of these devices may be equipped with wireless charging receivers that will operate with corresponding wireless charging transmitters. All of these devices may be charged from a single portable device, such as a smart phone 122. Because of the efficiency and regulated power transfer of various embodiments described herein, such charging may be performed with low battery drain in the transmitting unit (e.g., smart phone 122). In some implementations, portable devices may be charged in a relatively short period of time (e.g., 2-5 minutes) for a day's use. By limiting charging duration in this manner, battery drain in the transmitting unit may be further reduced.

In different embodiments, the charging of a portable device may be either user-initiated or automatic. In a user-initiated approach, a user might first place the device to be charged within proximity of the charging device (if not already in proximity) and/or into a desired orientation. The user might then initiate the charging process in the transmitter device. During the charging process, the system may continuously adapt to changing load conditions (caused by varying coupling and/or changing receiver device charge level). The process may be terminated when a desired charge level has been reached. In some embodiments, the process may be ceased before a full charge has been achieved (e.g., to save energy within the transmitter device).

It should be appreciated that the circuits, systems and techniques described herein may include one or more of the following features independently or in combination with another feature and that elements of different embodiments described herein may be combined to form other embodiments which may not be specifically set forth herein.

It should be appreciated that the described herein may be performed by circuits, including integrated circuits (sometimes simply referred to as "chips") such as a digital signal processor circuit, an application specific integrated circuit (ASIC), a field programmable gate array (FPGA), or conventional electrical or electronic systems or circuits. Some processing may be manually performed, while other processing blocks may be performed by circuitry and/or one or more processors. It should be noted that unless otherwise indicated herein, the particular sequences or processes described are illustrative only and can be varied without departing from the spirit of the concepts described and/or claimed herein. Thus, unless otherwise stated, the processes described are unordered meaning that, when possible, the sequences described can be performed in any convenient or desirable order.

While particular embodiments of concepts, systems, circuits and techniques have been shown and described, it will be apparent to those of ordinary skill in the art that various changes and modifications in form and details may be made therein without departing from the spirit and scope of the concepts, systems and techniques described herein. For example, some of the presented implementation examples show a system with a single receiver. It will be appreciated that the concepts described apply to systems including a plurality of receivers. Also, although efficiency tables may be used in some embodiments, in other embodiments, efficiency values may be dynamically computed and applied in real time without the use of tables or stored values. Also, in some embodiments, adapted (or dynamically computed) efficiency values may be applied substantially continuously (e.g with analog signals) while in other embodiments the efficiency values may be applied at discrete points in time. Other combination or modifications are also possible al of which will be readily apparent to one of ordinary skill in the art after reading the disclosure provided herein.

Having described preferred embodiments which serve to illustrate various concepts, systems circuits and techniques, which are the subject of this patent, it will now become apparent to those of ordinary skill in the art that other embodiments incorporating these concepts, systems circuits and techniques may be used. For example, it should be noted that individual concepts, features (or elements) and techniques of different embodiments described herein may be combined to form other embodiments not specifically set forth above. Furthermore, various concepts, features (or elements) and techniques, which are described in the context of a single embodiment, may also be provided separately or in any suitable sub-combination. It is thus expected that other embodiments not specifically described herein are also within the scope of the following claims.

Accordingly, it should be appreciated that elements of different embodiments described herein may be combined to form other embodiments which may not be specifically set forth herein. Various elements, which are described in the context of a single embodiment, may also be provided separately or in any suitable subcombination. Other embodiments not specifically described herein are also within the scope of the following claims.

In addition, it is intended that the scope of the present claims include all other foreseeable equivalents to the elements and structures as described herein and with reference to the drawing figures. Accordingly, the subject matter sought to be protected herein is to be limited only by the scope of the claims and their equivalents.

It is felt, therefore that the concepts, systems, circuits and techniques described herein should not be limited by the above description, but only as defined by the spirit and scope of the following claims which encompass, within their scope, all such changes and modifications.

All publications and references cited herein are expressly incorporated herein by reference in their entirety.

What is claimed is:

1. A receiver for use in a device-to-device wireless charging system utilizing inductive coupling through an inductive element to charge a load, the receiver comprising:
    a tuning capacitor having a capacitance value selected to tune out the inductance of the inductive element;
    a rectifier circuit having a pair of input terminals configured to be coupled to the inductive element through said tuning capacitor and a pair of output terminals;
    a converter circuit having a pair of input terminals coupled to the output terminals of said rectifier circuit and having a pair of output terminals configured to be coupled to the load; and
    an efficiency processor coupled to dynamically determine input voltage and current signals of said rectifier and to use the determined input voltage and current signals to generate an efficiency value used to control said converter such that an impedance looking into the rectifier input terminals over a given time period corresponds to an impedance which substantially maximizes efficiency of power transfer to the receiver and wherein said efficiency processor generates the efficiency value utilizing only dynamically determined values which are fully measurable in the receiver.

2. The receiver of claim 1 wherein said efficiency processor computes the efficiency value-according to:

$$\eta \propto k \times (V_L/(R_2+R_L))$$

in which:
    k is a coupling coefficient of the inductive coupling;
    $V_L$ is a voltage across the said rectifier circuit;
    $R_2$ is a resistance of the inductive element; and
    $R_L$ is an impedance at the input terminals of said rectifier circuit.

3. The receiver of claim 2 wherein said efficiency processor computes the impedance at the input terminals of said rectifier circuit $R_L$ according to:

$$R_L = V_L/I_L$$

in which:
    $V_L$ corresponds to an instantaneous ac voltage across the input terminals of said rectifier circuit; and $I_L$ corresponds to an instantaneous ac current into said rectifier circuit.

4. The receiver of claim 3 wherein said efficiency processor dynamically computes an efficiency value.

5. The receiver of claim 3 wherein said rectifier is provided as one of:
a class-$\phi_2$ rectifier circuit; and
a bridge rectifier circuit.

6. The receiver of claim 1 wherein said efficiency processor controls the input impedance of said rectifier by controlling a duty cycle of said converter.

7. The receiver of claim 1 further comprising a duty cycle controller coupled between said efficiency processor and said converter and wherein said efficiency processor provides signals to said duty cycle controller and in response thereto, said duty cycle controller controls a duty cycle of said converter.

8. The receiver of claim 7 wherein a duty cycle of said converter controls the impedance looking into the rectifier input terminals.

9. The receiver of claim 5 wherein said converter circuit is provided as a boost converter.

10. A receiver for use in a device-to-device wireless charging system utilizing inductive coupling through an inductive element to charge a load, the receiver comprising:
a class-$\phi_2$ rectifier circuit having a pair of input terminals configured to be coupled to the inductive element and a pair of output terminals;
a boost converter circuit having a pair of input terminals coupled to the output terminals of said class-$\phi_2$ rectifier circuit and having a pair of output terminals configured to be coupled to the load; and
an efficiency processor comprising a maximum efficiency point tracker (MEPT), said efficiency processor coupled to dynamically determine input voltage and current signals of said class-$\phi_2$ rectifier and to use the determined input voltage and current signals to generate an efficiency value used to control said boost converter such that an impedance looking into the class-$\phi_2$ rectifier input terminals corresponds to an impedance which substantially maximizes efficiency of power transfer to the receiver and wherein said MEPT generates the efficiency value utilizing only dynamically determined values which are fully measurable in the receiver.

11. The receiver of claim 10 wherein said MEPT generates an efficiency value by computing an efficiency value according to:

$$\eta \propto k \times (V_L/(R_2+R_L))$$

in which:
k is a coupling coefficient of the inductive coupling;
$V_L$ is a voltage across the said class-$\phi_2$ rectifier circuit;
$R_2$ is a resistance of the inductive element; and
$R_L$ is an impedance at the input terminals of said class-$\phi_2$ rectifier circuit.

12. The receiver of claim 10 wherein said MEPT computes the impedance at the input terminals of said class-$\phi_2$ rectifier circuit $R_L$ according to:

$$R_L = V_L/I_L$$

in which:
$V_L$ corresponds to an instantaneous ac voltage across the input terminals of said class-$\phi_2$ rectifier circuit; and
$I_L$ corresponds to an instantaneous ac current into said class-$\phi_2$ rectifier circuit.

13. The receiver of claim 10 wherein said MEPT controls the input impedance of said class-$\phi_2$ rectifier by controlling a duty cycle of said boost converter.

14. The receiver of claim 10 further comprising a duty cycle controller and wherein said MEPT provided signals to said duty cycle controller and wherein said duty cycle controller controls the input impedance of said class-$\phi_2$ rectifier by controlling a duty cycle of said boost converter.

15. A receiver for use in a device-to-device wireless charging system utilizing inductive coupling, the receiver comprising:
a resonant-tuned coil;
a tuning capacitor having a capacitance value selected to tune out the inductance of the resonant-tuned coil;
a rectifier circuit having a pair of input terminals configured to be coupled to said resonant-tuned coil through said tuning capacitor and a pair of output terminals;
a converter circuit having a pair of input terminals coupled to the output terminals of said rectifier circuit and having a pair of output terminals configured to be coupled to the load; and
an efficiency processor coupled to dynamically determine input voltage and current signals of said rectifier and to use the determined input voltage and current signals to generate an efficiency value used to control said converter such that an impedance looking into the rectifier input terminals corresponds to an impedance which substantially maximizes efficiency of power transfer through inductive coupling to the receiver and wherein said efficiency value is generated utilizing only dynamically determined values which are fully measurable in the receiver.

16. The receiver of claim 15 wherein said efficiency processor generates said efficiency value according to:

$$\eta \propto k \times (V_L/(R_2+R_L))$$

in which:
k is a coupling coefficient of the inductive coupling;
$V_L$ is a voltage across the said rectifier circuit;
$R_2$ is a pre-measured resistance value of the resonant-tuned coil; and
$R_L$ is an impedance at the input terminals of said rectifier circuit.

17. The receiver of claim 16 wherein said efficiency processor computes the impedance at the input terminals of said rectifier circuit $R_L$ according to:

$$R_L = V_L/I_L$$

in which:
$V_L$ corresponds to an instantaneous ac voltage across the input terminals of said rectifier circuit; and
$I_L$ corresponds to an instantaneous ac current into said rectifier circuit.

18. The receiver of claim 17 wherein said efficiency value is dynamically computed.

19. The receiver of claim 18 wherein said efficiency processor controls the input impedance of said rectifier by controlling a duty cycle of said converter.

20. The receiver of claim 19 further comprising a duty cycle controller coupled between said efficiency processor and said converter and wherein said efficiency processor provides signals to said duty cycle controller and in response thereto, said duty cycle controller controls a duty cycle of said converter and wherein a duty cycle of said converter controls the impedance looking into the rectifier input terminals.

* * * * *